United States Patent
Toofan et al.

(10) Patent No.: US 8,789,746 B2
(45) Date of Patent: Jul. 29, 2014

(54) PRODUCT AUTHENTICATION USING INTEGRATED CIRCUITS

(75) Inventors: Mehrdad Toofan, Davis, CA (US); Mehzad Toofan, Fairfield, CA (US)

(73) Assignee: Solexir Technology Inc., Milpitas, CA (US)

( * ) Notice: Subject to any disclaimer, the term of this patent is extended or adjusted under 35 U.S.C. 154(b) by 855 days.

(21) Appl. No.: 12/697,224

(22) Filed: Jan. 30, 2010

(65) Prior Publication Data

US 2010/0140344 A1    Jun. 10, 2010

Related U.S. Application Data

(60) Provisional application No. 61/148,954, filed on Jan. 31, 2009.

(51) Int. Cl.
  *G06F 17/00*    (2006.01)
  *G06K 19/14*    (2006.01)
  *G06K 19/077*   (2006.01)
  *G06K 17/00*    (2006.01)

(52) U.S. Cl.
  CPC .......... *G06K 19/14* (2013.01); *G06K 2017/009* (2013.01); *G06K 19/07703* (2013.01)
  USPC ...................................................... 235/375

(58) Field of Classification Search
  CPC ....... G06Q 30/02; G07F 7/1008; G06K 17/00
  USPC ................................................... 235/375
  See application file for complete search history.

(56) References Cited

U.S. PATENT DOCUMENTS

| | | | |
|---|---|---|---|
| 7,304,578 B1 * | 12/2007 | Sayers et al. | 340/572.3 |
| 7,429,926 B1 * | 9/2008 | Drimer | 340/572.7 |
| 7,845,553 B2 * | 12/2010 | Holz et al. | 235/379 |
| 8,037,294 B2 * | 10/2011 | Nochta | 713/150 |
| 2003/0172268 A1 * | 9/2003 | Walmsley et al. | 713/168 |
| 2004/0049678 A1 * | 3/2004 | Walsmley et al. | 713/168 |
| 2004/0250066 A1 * | 12/2004 | Di Luoffo et al. | 713/168 |
| 2008/0143487 A1 * | 6/2008 | Hulvey | 340/10.34 |
| 2008/0182592 A1 * | 7/2008 | Cha et al. | 455/456.3 |
| 2008/0250483 A1 * | 10/2008 | Lee | 726/7 |

* cited by examiner

*Primary Examiner* — Michael G Lee
*Assistant Examiner* — Rafferty Kelly

(57) ABSTRACT

Authentication of a product could be accomplished by utilizing encryption and decryption engines onboard two integrated circuits namely a DECENC chip and a READER chip. A unique serial number in either an encrypted or un-encrypted format is programmed into eFuses, or OTP devices on board the DECENC chip where this chip is then attached to the product. During the authentication procedure, the encrypted and decrypted serial number on board the DECENC chip is transferred to the READER chip. The READER chip subsequently performs a decryption of the serial number from the first chip if this serial number is in encrypted form or performs an encryption of the serial number from the first chip if this serial number is in un-encrypted form. The READER chip then compares its result of decryption or encryption against the corresponding decrypted or encrypted versions of the serial number received from the DECENC chip. If the results of decryption or encryptions for both chips are the same, then the READER chip signals an authentic product, otherwise it will reject the product as fake.

23 Claims, 7 Drawing Sheets

PRODUCT AUTHENTICATION USING INTEGRATED CIRCUITS

CROSS-REFERENCE TO RELATED APPLICATIONS

Figure 1:
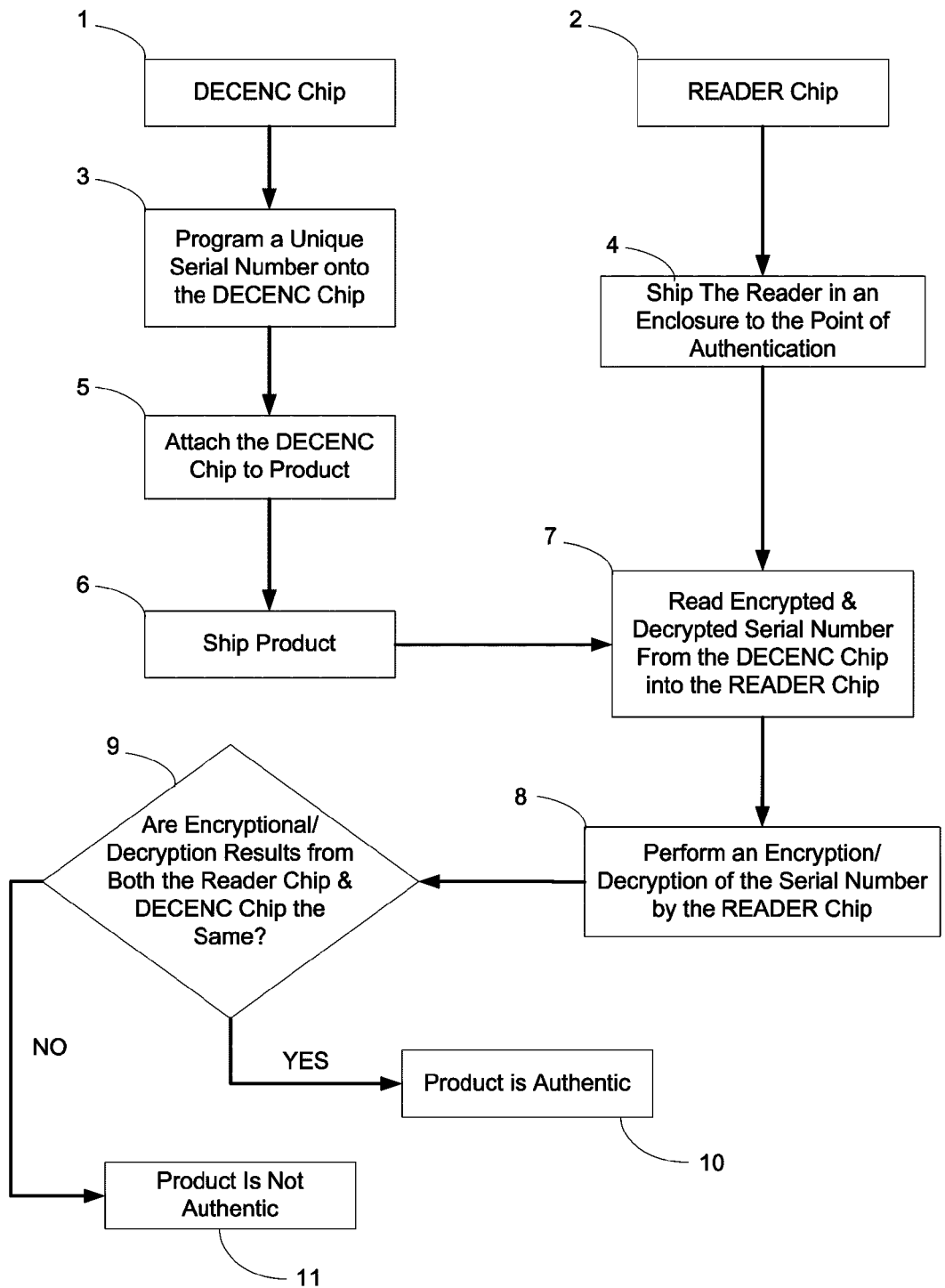

This application claims the benefit, under 35 U.S.C. §119, of U.S. Provisional Application Ser. No. 61/148,954, filed on Jan. 31, 2009.

BACKGROUND OF THE INVENTION

1. Field of the Invention

The present invention relates to a counterfeit detection method that can be used to authenticate a particular brand of a manufactured good.

2. Description of Related Art

The counterfeit industry is a huge and profitable market parallel only to illegal drug manufacturing and distribution. The ramification of counterfeit goods upon society goes beyond unauthorized distribution and branding of goods for the sake of monetary gains. In the health industry, for example, the consequences of counterfeit drug manufacturing are mostly catastrophic. As an example, World Health Organization (WHO) reports that "during a meningitis epidemic in Niger in 1995, more than 50000 people were inoculated with fake vaccines resulting in 2500 deaths. The vaccines were received as a gift from a country which thought they were safe."

The manufacturers of a specialty brand may have put huge amount of resources into developing a particular good in terms of R&D, production, marketing and distribution. The counterfeit products will not only lower the sale of the legitimate product, it will reduce or eliminate the confidence of an end user in a particular brand. This notion becomes more tangible and makes more common sense in the case of fighting against a death threatening disease such as Malaria: When the counterfeit drug is manufactured with a small amount of the actual ingredient (to hide its authenticity), over time the parasite becomes resistant to that particular medicine irrespective of how effective the actual drug historically might have been in combating the deadly disease.

Many manufactures have taken various levels of defense mechanisms for their products against counterfeiting to protect their investments. However, as the technology advances, the counterfeit industry has learned to become more and more sophisticated and has learned to come up with its own ingenious methods to countermeasure the manufacturer's protection shields.

One method that is used by legitimate manufacturers in their fight against counterfeiting is to embed certain chemicals of certain characteristics that could be used to identify an authenticated good. Such detections rely upon the nature of chemical compound such as its impurity profile, crystal form, particle size or thermal behavior to determine the authenticity of the product under investigation. There are certain techniques such as infrared spectroscopy, Raman spectroscopy, X-ray powder diffraction, polarized microscopy, and numerous chromatography methods to carry the authenticity test. However, these methods require advance and well equipped laboratories, and they are time consuming and quite expensive. Furthermore, for drugs, these techniques require opening the package and hence eliminating safe usage of untested pills.

Another method used to fight against the counterfeiting is in manufacturing appropriate package for a manufactured good such that it would be either very difficult or quite costly to reproduce. Yet another possibility is the inclusion of Holograms or some sort of color shifting ink on the packages. But reliance on such defense mechanisms was originally promoted based on the fact that such technologies are prohibitively costly to implement by a counterfeiter. With advances in image processing software and cheap PCs that notion no longer holds any credibility.

Another authentication method used by manufactures is the use of Radio Frequency Identification (RFID) electronic chip embedded within a product. A specific code associated with a particular product is included with the RFID chip. Special reader is then used to read the code wirelessly and authenticates the product. The drawback with RFID solution is its associated cost which makes it especially unattractive for very low cost products (such as anti-malaria drugs). Furthermore, there are some read errors associated with RFID which puts into question the reliability and dependencies of the authentication method.

Yet another authentication method is the usage of multicolored particles imprinted upon or combined with the ingredient of a product. The product could then be given a "fingerprint" color code that could be detected during the authentication process. The identification process could be made more resilient to reverse engineering by combining the multicolored particles with other chemicals of specific properties (such as spectral emission, or infrared emission). The authentication could rely simply on the presence of specific color code, pattern matching using a camera based system, or laboratory analysis. The drawback with this detection system, aside from costly color code generation for each product item, is the level of authenticity that one requires as obviously a laboratory analysis is far more expensive than a simple presence test. Extension to these methods are inks which are visible when exposed to ultraviolet or infrared light; concealed micro printing technologies which carry a specific message; or pattern printing which are revealed only when a screened key is placed over the printed area. All these methods are hardly any major obstacle to any determined counterfeiter with enough resources.

Kodak "Traceless Technology" uses an odorless and colorless powder marker which is mixed with printing inks that is deployable on labels and packages. The marker is then detected by Kodak provided handheld readers. The company claims that competitive readers will not detect Kodak's markers and as such is immune to counterfeiting.

Hewlett Packard approach to the problem, called "Memory Spot", is based on a principle similar to RFID and thus suffers the same shortfalls.

Encryption method is another deterrent method and one that is also used in this invention though in a totally different fashion. In prior art, a product is given a digital identity, or a serial number, which is encrypted and printed on the product in an alphanumerical form. This digital number could be also accompanied by an associated bar code to be read by a scanner. The encoded and printed digital identity is thus either manually or via a scanner is passed on to an interne site or to a call center through a phone equipped with SMS for verification. Such a method though may be effective for a small number of products; it cannot be universally applied as it certainly will flood the internet site or the call center making it virtually ineffective and quite time consuming to do a real time authentication and verification.

U.S. Pat. No. 6,996,543 issued to Coppersmith et al., tries to alleviate the above problem by using private/public pair keys where serial number are first encrypted by a pair. A reader system then reads and subsequently decodes the smart card's content and accompanying product's label using appropriate and corresponding public key pairs. Verification and authentication process then requires a comparison between the two for equality. Other than the fact that this method would require including a smart card (whose production is quite costly for most manufactures) along with every package, it is easily susceptible to counterfeiting: One with enough resources could create a smart card which could easily generates the sequence codes seen on the label. That is the counterfeiter could make a fake chip on board the smart card which feeds the smart card reader what it needs for authentication, namely the printed information seen on the label. Once that is accomplished, batches of smart cards along with duplicated labels could be made to defeat the purpose.

SUMMARY OF THE INVENTION

Referring to FIG. 1, briefly, the invention requires an encryption/decryption processor chip 1 (from now on referred to as DECENC chip) that accompanies a product, and a reader chip 2 (from now on referred to as READER chip) which is independently shipped to any point of authentication. In this invention, encryption and encoding are used interchangeably. Similarly, decryption and decoding are used interchangeably. The DECENC chip includes at least one functional unit in charge of encryption or decryption of a message. Furthermore, the DECENC chip contains a unique serial number 3 associated with the product. This serial number 3 comes in form of a series of alphanumeric digits which could also optionally be printed on a tag or on the product's label. The encryption/decryption key is embedded within the DECENC 1 and READER 2 chips and never leaves them. The READER 2 chip is shipped individually by the manufacturer to the point of sales 4 and obviously is far less in quantities compared to all unique DECENC chips that accompany a line of product. At the point of authentication, the READER 2 chip reads 7 both the serial number 3 and an encoded version of the serial number 3 from the DECENC chip. The READER 2 chip then performs an encoding 8 of the serial number similar to the encryption operation preformed by the DECENC chip 1 over the serial number. If the encoded serial number read from the DECENC chip 1 is the same as that preformed by the READER chip, the READER 2 signals the authenticity of the product 9, 10, & 11.

One advantage of the present invention is that the key never leaves the chips. Another advantage of the present invention is that each DECENC chip has a unique serial number which makes it economically impossible to reverse engineer the chip. Another advantage of the present invention is that due to submicron implementation of these chips, they are very hard to duplicate. Another advantage of the present invention is that the authenticity of the READER chip could be independently verified remotely via internet or via a call center thus making the authenticity process more robust.

These and other objects and advantages of the present invention will no doubt become obvious to those of ordinary skill in the art after having read the following detailed description of preferred embodiments which are illustrated in the drawing figures.

IN THE DRAWINGS

FIG. 1 depicts the method wherein an encrypted or decrypted serial number 3 is read from the DECENC chip 1 into the READER chip 2. This authentication methodology requires the READER chip 2 to perform similar encryption or decryption 8 of the serial number 3 followed by a comparison 9 against the encryption or decryption of the serial number 3 received from the DECENC chip 1.

Figure 2:
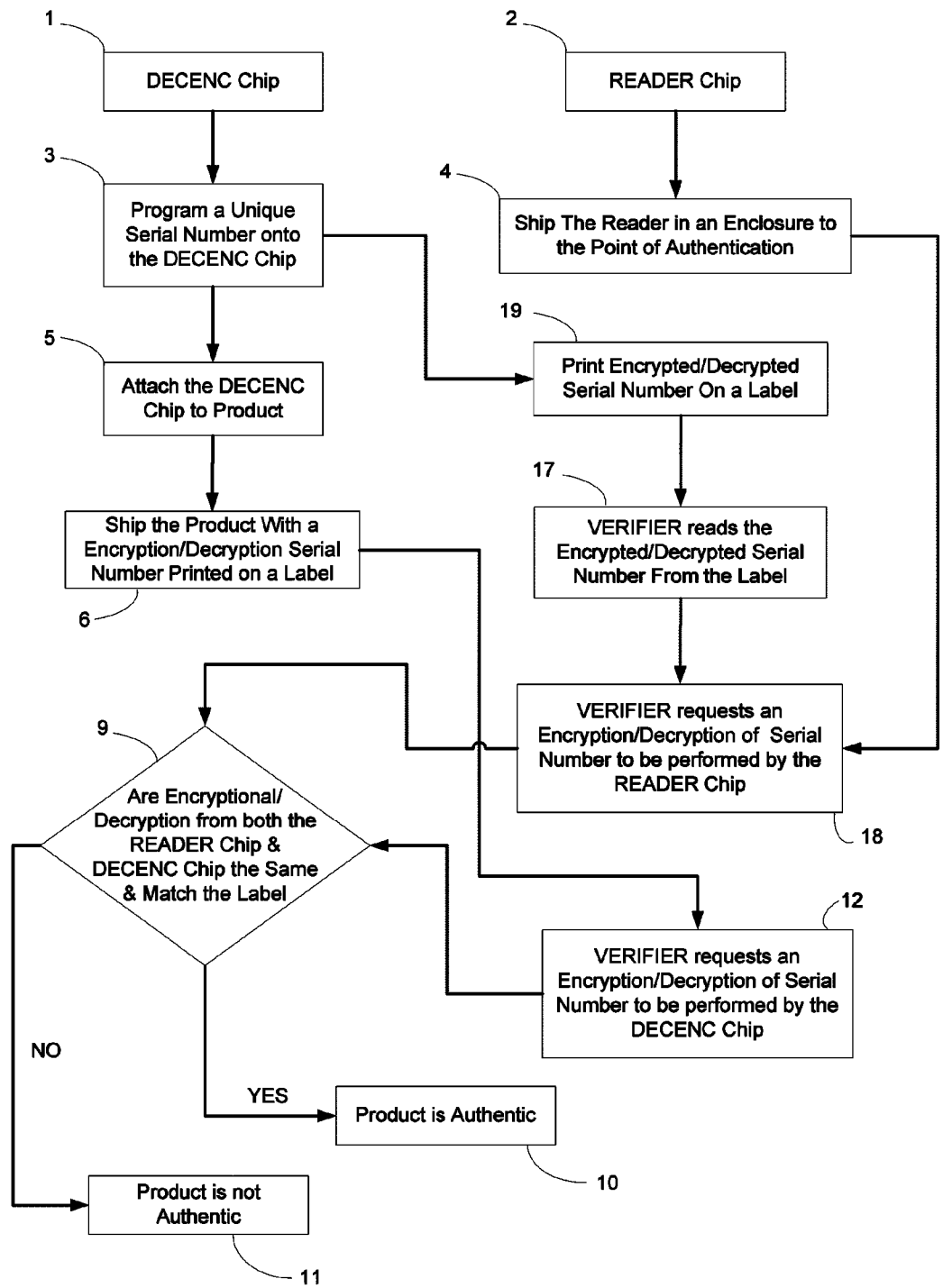

FIG. 2 depicts the method wherein a VERIFIER 17 first reads an encrypted/decrypted serial number 3 from the product label 19. Subsequently, the VERIFIER 17 sends this serial number 3 to both the DECENC chip 1 and the READER chip 2 requesting them to perform an encryption or decryption 12 & 18 of the serial number 3. Should the results of this encryption/decryption from both DECENC chip 1 and the READER chip 2 is the same 9, the VERFIER signals the authenticity of the product 10.

Figure 3:
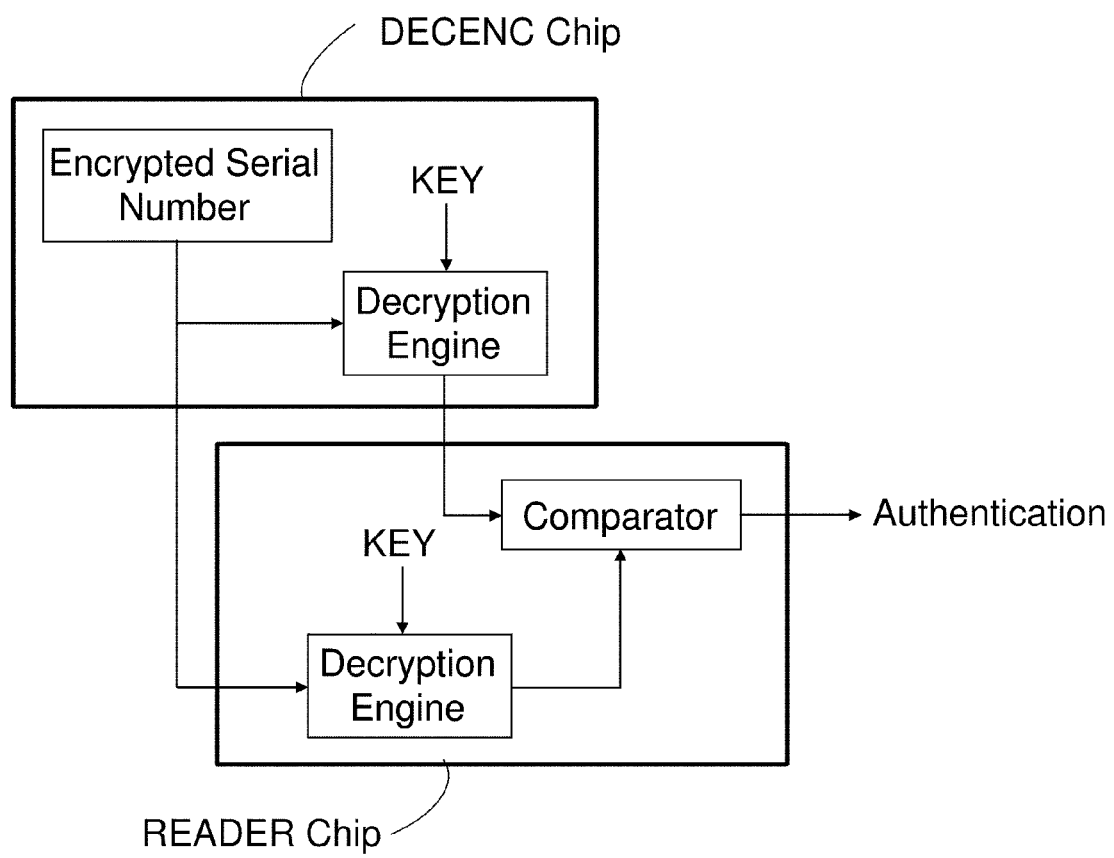

FIG. 3 depicts the authentication procedure wherein encrypted serial number along with its decryption value is passed on to the READER chip 2. The READER chip 2 subsequently decrypts received encrypted serial number and compares it against the decrypted serial number from DECENC chip 1 for authentication.

Figure 4:
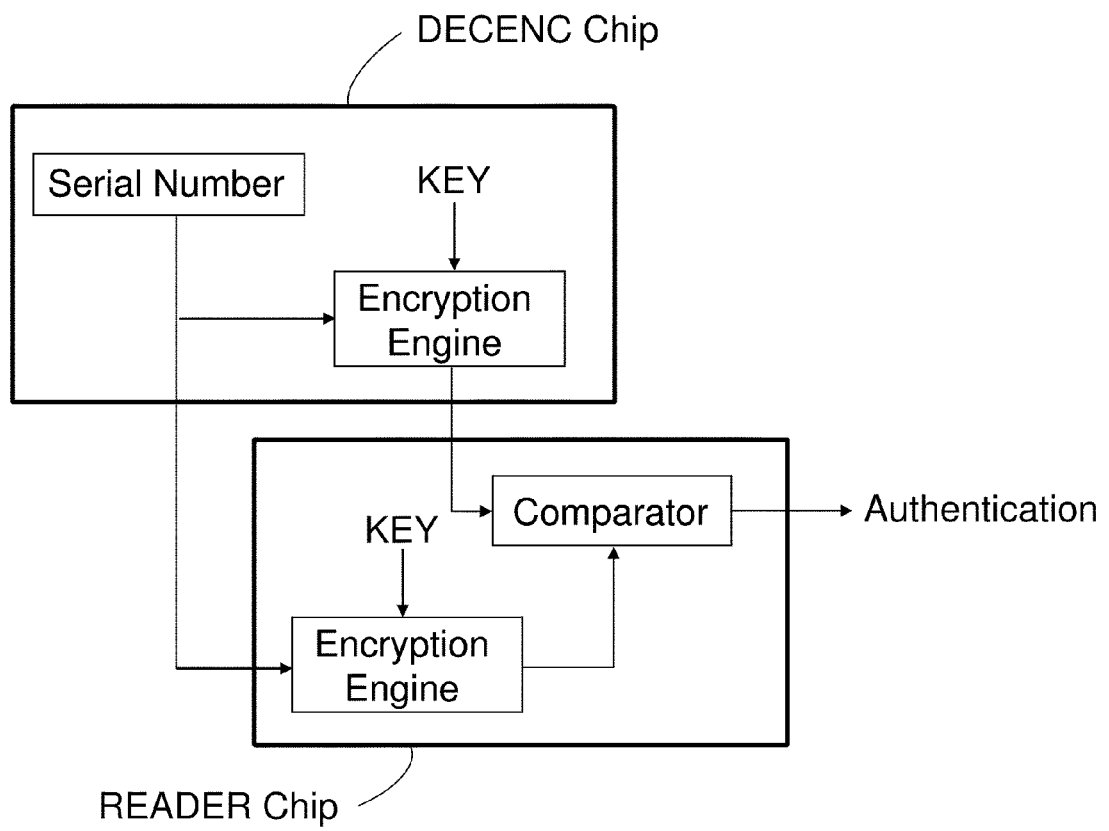

FIG. 4 depicts the authentication procedure wherein serial number along with its encrypted value is passed on to the READER chip 2. The READER chip 2 subsequently encrypts received serial number and compares it against the encrypted serial number from the DECENC chip 1 for authentication.

Figure 5:
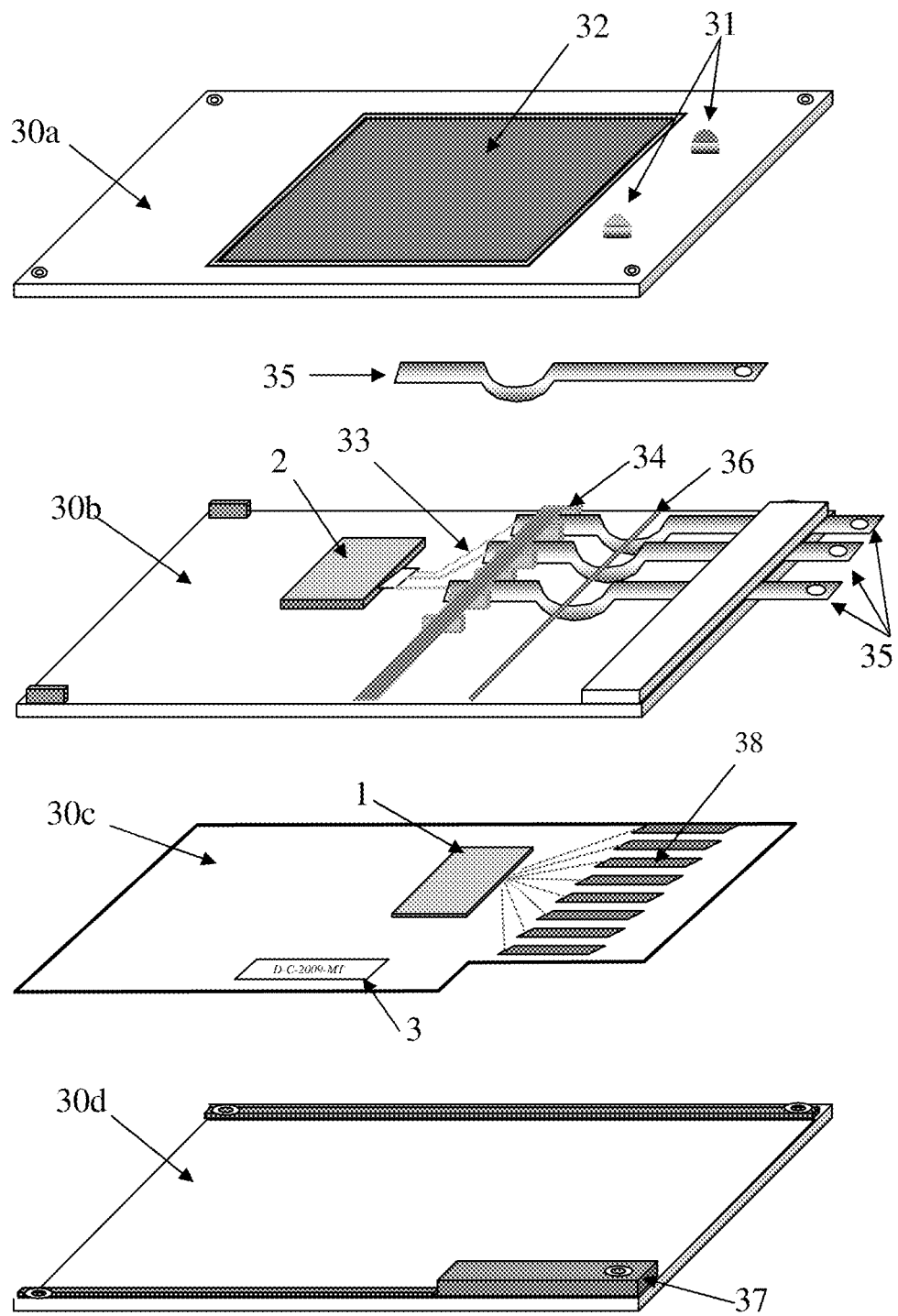

FIG. 5 depicts an example of an enclosure containing the READER chip 2 made of 3 supporting trays 30a, 30b, and 30d. The top tray 30a is equipped with LEDs 31 or LCD screen 32 so that the nature and authentication result of a product could be displayed. The connection tray 30b carries the READER chip 2 whose interface pins are connected to a set of copper strip springs 35 through connections 33. The copper strip springs 35 allow direct contact to the interface pins 38 of the DECENC chip 1 attached to the product label 30c. The strip cells 34 on the connection tray 30b are used to hold and to align the copper strip springs 35 against the product label connections 33. The card tray 30d contains card guide 37 which allows the product label 30c to slide through and be positioned in such a way so that the interface pins of DECENC chip 1 and the READER chip 2 come into direct physical contacts through the copper strip springs 35. Finally, the product label 30c carries the DECENC chip 1 along with possibly a printed serial number 3 for visual inspection.

Figure 6:
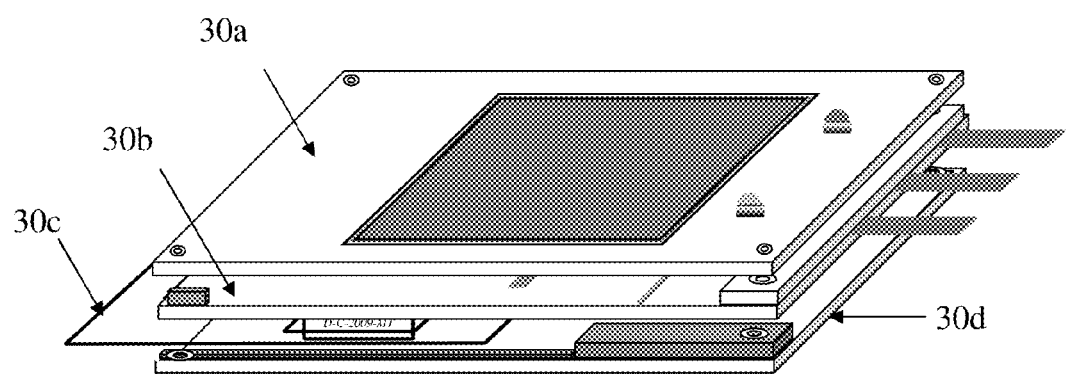

FIG. 6 shows the assembly for the parts mentioned for FIG. 5 above where in the product label 30c containing the DECENC chip 1 has been inserted into the assembly 30a, 30b, and 30d for authentication.

Figure 7:
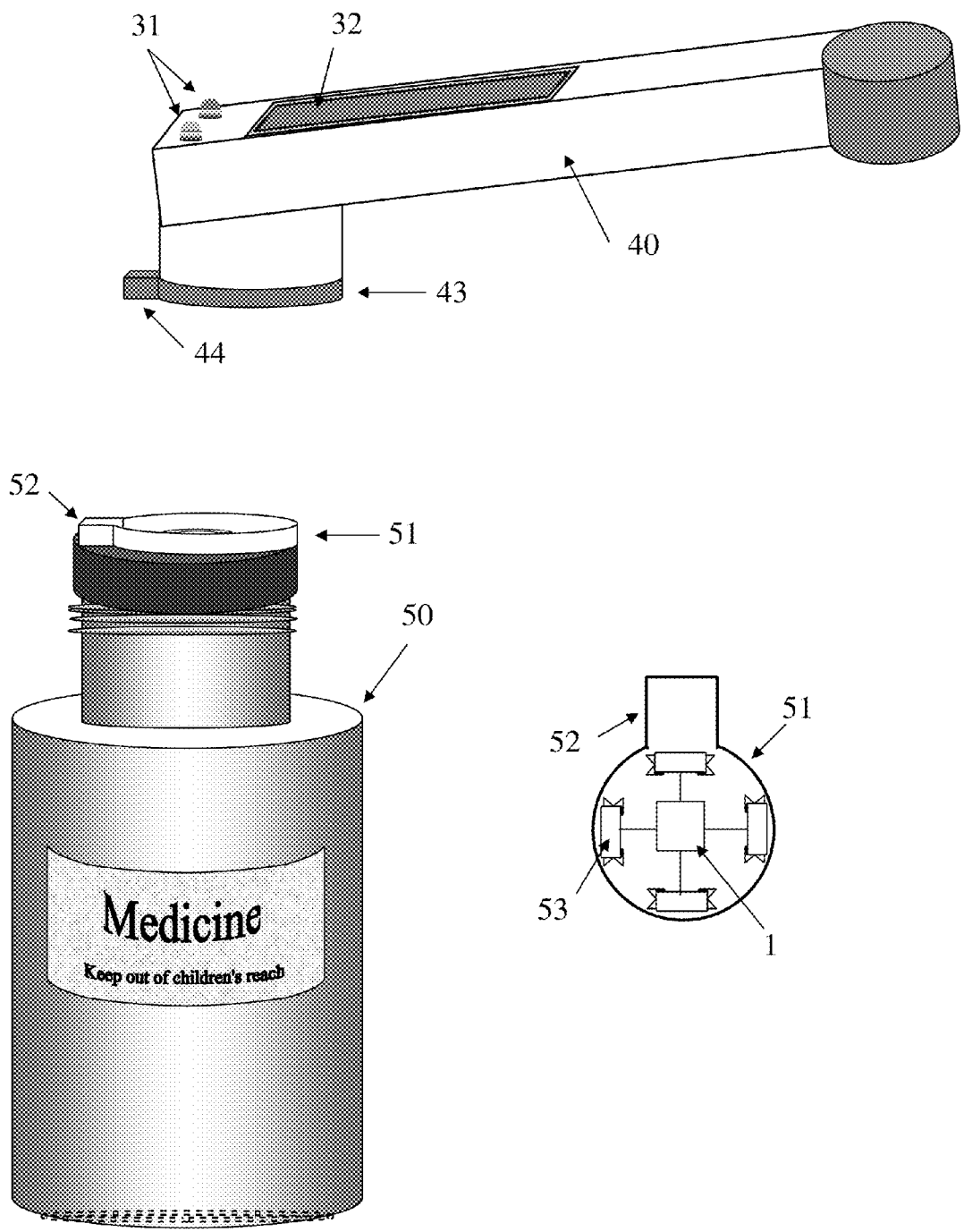

FIG. 7 depicts another alternative enclosure to authenticate a product. In this figure, the spring handle 40 which carries the READER chip 2 internally comprises of an LCD 32 and or LEDs 31 for displaying the authentication results as well as providing information regarding the nature of the product. The spring handle 40 is equipped with the electrical connection 43 at the end which also has a male notch 44 for alignment of the READER chip 2 pins interface against the DECENC chip 1 pins interface 53. The product 50 carries an electrical connection 51 which is also equipped with a female notch alignment 52 to be aligned with male notch 44 during the authentication. The electrical connection 51 further carries the DECENC chip 1. During the authentication process, the spring handle 40 is brought in the vicinity of product's electrical connection 51 while aligning the notches 44 and 52. Lowering the spring handle 41 such that connections are made between the DECENC chip 1 pins interface 53 and the READER chip 2 interface will cause the authentication process to start and the results are displayed on LEDs 31 or the LCD 32.

DETAILED DESCRIPTION OF THE INVENTION

Despite all preventive measures and all deterrent methods used, the counterfeiting market is so huge that sooner or later, a determined counterfeiter would find a way to circumvent any defense mechanism set up by a legitimate manufacturer. To give a sense of money involved, WHO cites the Center for Medicine in the Public Interest's prediction that counterfeit drug sales alone will reach $75 billion globally in 2010 an increase of more than 90 percent from 2005. Most defense schemes against counterfeiting revolve around how to prevent a counterfeiter to reverse engineer or bypass the deterrent method used.

The philosophy behind the present invention is that given the fact that a counterfeiter may one day find a way to reverse engineer the suggested method, it would be economically impossible and unprofitable for him to do so.

The present invention relies mainly on encryption/decryption algorithms. There are several popular encryption/decryption algorithms of which most notably are AES, Triple DES, Twofish, Blowfish etc. These algorithms rely on a "key" for encryption/decryption process that is known only to the manufacturer. Referring to FIG. 1, the product's manufacturer assigns a unique serial number 3 to each product that will be programmed into the DECENC chip 1 in forms of alphanumerical digits or binary digits. Variety of information could be part of this serial number such as manufacturer's name or ID, product's identification number or name, manufacturing date, or other vital information (for drugs) for example. Furthermore, it is possible to include an unencrypted "opcode" as part of the serial number. Such an "opcode" functions as an instruction code dictating to the READER and DECENC chips for example which encryption/decryption algorithms to choose; whether or not the serial number is encrypted and how; how many times they have to process the serial number; if any reshuffling is needed at the end; the memory address where the final encoding/decoding result would resides; which "key" to be used for an encryption/decryption process (in case that multiple keys were defined on the mentioned chips); any needed strategy for authentication; or any other defined operation which makes sense to the manufacturer.

Subsequently, the DECENC chip 1 will be glued to the product's label or to the product. Such a chip has at least one or multiple encryption/decryption algorithms implemented to support the accompanying serial number. Furthermore, it is recommended to use submicron process technologies (such as 130 nm and below) to implement the DECENC chip 1. This will not only reduce the overall price of the chip substantially, it also makes it quite hard for a counterfeiter to reverse engineer the intellectual property content and physical layout of the chip. To further reduce price of the DECENC chip 1, it is recommended to use minimum number of pins for the chip interface other than power and ground pins. For example, one could use a serial interface (such as I2C, or SPI) for data transfer. It is also notable that power and possibly the clock are going to come from the READER's 2 circuit board and being fed to the DECENC chip 1. A status register on board the DECENC chip 1 may also be used by the READER chip 2 (using a polling mechanism) to investigate when the DECENC chip 1 has finished encoding or decoding a message or the serial number 3. Alternatively, or in addition, the DECENC chip 1 could have an interrupt pin that signals to the READER chip 2 the completion of a task thus achieving a higher performance at the cost of an extra pin. The final result would then be read by the READER chip 2 from a particular memory address onboard the DECENC chip 1. It is also envisioned that the DECNEC chip 1 would be accessed by the READER 2 (for supplying power and clock to the DECNEC, and data interchange between the two chips) via some simple physical contacts imprinted on the package label or the product itself where the DECENC chip 1 has been glued to. One alternative to this direct contact to the DECENC chip 1 pins for delivery of power, clock and data transmission is to use wireless principle: One could deliver power and data from the READER circuit board 2 to the DECENC chip 1 wirelessly, albeit at a higher production cost.

On board the DECENC chip resides a serial number 3 corresponding to what is potentially printed on the product label. This implies that every DECENC chip 1 would have a unique identification number possibly buried well within the device. To achieve this, one may use eFUSES (originally from IBM), Poly fuses, Metal fuses, or One Time Programming (OTP) devices, which are now common in semiconductor industry, to program and tag each DECENC chip with a unique serial number. This step is normally carried out after the chip has been manufactured and is back for testing. Such a unique numbering per chip would effectively make it economically impractical (if not impossible) to reverse engineer the DECENC chip 1.

Corresponding to all or a portion of a manufacturer's product portfolio, the present invention requires another chip which we have been calling the READER chip 2. The READER chip 2 has a logical structure very much similar to what is seen on DECENC chip 1 which is considered to be another advantage in such a cost sensitive environment. The manufacturer will distribute 4 one READER chip 2 to each point of sale or point of authentication. The operator at a point of sale/authentication could easily verify the authenticity of the READER chip 2 itself by phone, or via a web site setup by the manufacturer. To do so, the manufacturer could send along an Identification Tag for the READER chip 2 which could be verbally communicated over the phone, or entered into the manufacturer site for authenticity and verification. A more elaborate scheme will be explained later.

To verify the authenticity of a product, the READER 2 expects that the DECENC chip 1 to respond to its inquiry the same way that is carried out by the READER chip 2 itself. The link between the DECENC chip 1 and the READER chip 2 is the serial number 3 that is programmed into the DECENC chip 1. There could be at least two possibilities associated with a verification process:

1. The serial number 3 on the DECENC chip 1 is either fully or partially encoded. In such a scenario, as detailed in FIG. 1, the READER 2 reads 7 the serial number 3 from the DECENC chip 1 and requires the DECENC chip 1 to perform a decryption of the encoded serial number 3. The READER chip 2 itself also performs a decryption of the received serial number and then waits for the decryption process for the DECENC chip to finish. Once that result becomes available, the READER chip 2 reads it 7 and compares 9 it against its own decryption result. If decryption results of both the READER chip 2 and the DECENC chip 1 are the same, then the READRE chip signals that the product is authentic 10 & 11.

FIG. 3 depicts the overall authentication structure described above wherein encoded serial number along with its decryption is passed on from the DECENC chip to the READER chip. The READER chip subsequently decrypts the received encrypted serial number from the DECENC chip and compares it against the decrypted serial number from the DECENC chip for authentication.

2. The serial number 3 on the DECENC chip 1 is not encoded. In such a scenario, as detailed in FIG. 1, the READER 2 reads 7 the serial number 3 from the DECENC chip 1 and requires the DECENC chip 1 to perform an encryption of the serial number 3. The READER chip 2 itself also performs an encryption of the received serial number 3 and then waits for the encryption process for the DECENC chip 1 to finish. Once that result is available, the READER chip 2 reads it 7 and compares 9 it against its own encryption result. If encryption results of both the READER chip 2 and the DECENC chip 1 are the same, then the READRE chip 2 signals that the product is authentic 10 & 11.

FIG. 4 depicts the overall authentication structure described above wherein serial number along with its encryption is passed on from the DECENC chip to the READER chip. The READER chip subsequently encrypts the received serial number from the DECENC chip and compares it against the encrypted serial number from the DECENC chip for authentication.

In its most economical form, the READER chip 2 in the above method is envisioned to be embedded in an enclosure upon which one may find necessary metal traces for contact to the DECENC chip 1 pins. Furthermore, it might have an LED to show if the verification process has failed or not (for example, a green LED means that verification has passed, or a red LED implies the verification failure), or use audio signals and/or audio devices to inform the user of the authenticity of the product. It is thus envisioned that the READER chip 2 is equipped with a battery or some other means of power generation. Furthermore, the READER could be queried or instructed to provide information about the nature of the product that the READER tries to authenticate. For example, the READER could get this information by investigating or interpreting the serial number of the product and displays it on an LCD or passes it on to an attached device for further processing and display. An example of such an enclosure for the READER chip 2 has been depicted in FIGS. 5 and 6. Another alternative for such enclosure are also shown in FIG. 7.

Referring to FIG. 2, there could be situations where the manufactures wants to include a label 19 upon which the serial number 3, which is programmed into the DECENC chip 1, is printed. Such a label 19 would have a few benefits; one of the most important advantages of all is that an independent entity could be used as the arbiter between the READER chip 2 and DECENC chip 1 to verify the authenticity of a product. Such an entity, which we will call the VERIFIER from now on, will engage with the READER chip 2 and the DECENC chip 1 individually and separately (possibly providing both power and data to each chip) to verify a product authenticity. There are a number of possibilities and combinations when including a label with a serial number printed on it:

1. The serial number 19 on the product label is not encrypted, but the one 3 in the DECENC chip 1 is. In such a scenario, the VERIFIER might require 12 the DECENC 1 to decrypt the buried serial number 3 within the DECENC chip 1. The READER chip 2, which receives the serial number 19 on the product label through VERIFIER 17, is also requested 18 by the VERIFER to perform an encryption. The VERIVIER then not only compares 9 the encrypted serial number received from the READER chip 2 against encrypted serial number 3 within the DECENC chip 1, it could also check to see if the decrypted serial number from the DECENC chip 1 is the same as that found on the label 19 for authentication 10 & 11.

2. The serial number on both the product label 19 and within the DECENC chip 2 is encrypted. In such a scenario, the VERIFIER might require 12 the DECENC 1 to decrypt the buried serial number within the DECENC chip 1. The READER chip 2, which receives the serial number 19 on the product label through VERIFIER 17, is also requested 18 to perform a decryption. The VERIVIER then compares 9 the decrypted serial number received from the READER chip 2 against decrypted serial number within 3 the DECENC chip to authenticate 10 & 11 the product.

3. The serial number on the product label 19 is encrypted, but the one 3 in the DECENC chip 1 is not. In such a scenario, the VERIFIER might require 12 the DECENC 1 to encrypt the buried serial number 3 within the DECENC chip 1. The READER chip 2, which receives the serial number on the product label through VERIFIER 17, is also requested 18 by the VERIFER to perform a decryption. The VERIVIER then not only compares 9 the encrypted serial number received from the DECENC chip 1 against encrypted serial number on the label 19, it could also check to see if the decrypted serial number from the READER chip 2 is the same as that from the DECENC chip for authentication 10 & 11.

4. The serial number on both the product label 19 and within the DECENC chip 1 is not encrypted. In such a scenario, the VERIFIER might require 12 the DECENC 1 to encrypt the buried serial number 3 within the DECENC chip 1. The READER chip 2, which receives the serial number 19 on the product label through VERIFIER 17, is also requested 18 to perform an encryption. The VERIVIER then compares 9 the encrypted serial number received from the READER chip 2 against encrypted serial number 3 within the DECENC chip 1 to authenticate the product 10 & 11.

The idea is that at least one decryption or encryption operation is being preformed by both the READER chip 2 and the DECENC chip 1. As mentioned before, part of the serial number could be used as an "operation instruction" (opcode) dictating to either of the two chips on how to carry out their decryption or encryption process.

It is obvious from ongoing discussion that either the READER chip 2 or the VERIFIER (in FIG. 2) will have the ultimate responsibility to carry out the authenticity task: If this is the responsibility of the READER chip 2 to authenticate a product (METHOD 1, FIG. 1), then the READER chip 2 needs to be placed in an enclosure with appropriate circuit board contacts so that information onboard the DECENC chip 1 could be easily transferred to the READER chip 2, where that could be accomplished through physical contacts or wirelessly. As mentioned before it is also envisioned that the READER chip 2 is equipped with a battery or some other means of power generation. This would most economically be the source of power for the DECENC chip 1 as well.

Alternatively, if the VERIFIER (FIG. 2) has the responsibility to authenticate a product (METHOD 2, FIG. 2), then both the READER chip 2 and the DECENC chip 1 may act as passive elements where they receive power, clock, and data directly from the VERIFIER. In fact, the VERIFIER (FIG. 2) needs to scan the label (FIG. 2, 17) and pass serial number information to the READER chip 2 as part of the verification process. As mentioned before, the most economical solution is to provide power, clock, and data transfer though some simple physical contacts and metal circuit traces.

To make the counterfeiting of the product even more robust in the present invention, the verification process in addition to, or in replacement of the above authentication strategy, may implement the following scheme: As is common knowledge, the mentioned encryption/decryption algorithms are based on a "key" string which is only known to the manufacturer of the product and is kept secret all the time. The "key" is used to encrypt or to decrypt a message. The "key" is embedded within the two chips and never leave them. A variable parameter, such as the date and the time of verification, maybe passed to both DECENC and READER chips. This variable parameter will be used by these chips to scramble the "key" further before being used to encrypt or decrypt the serial number on the label, or the serial number within the DECENC chip. Although the result of such decryption/encryption operations is going to be different at various authentication times (due to this variable parameter), the final results of the two chips would be identical. This is to prevent counterfeiting to occur even for the situation where someone could mimic and fake the response of the DECENC chip or the READER chip for various serial numbers.

Another possibility for generating a variable, and then using this variable to scramble the "key", is to use random number generators onboard both DECENC and READER chips. Such random generators are quite easy to implement digitally. In fact, it is envisioned that the seed value for these so called pseudo-random number generators as well as terminating end point of such patterns could come from the serial number itself.

Moreover, the seed values could be unique for each product item to make the counterfeiting even harder. To give an example, assume we are dealing with a 128 bits key. There could be a 32 bit seed value along with some extra bits within the serial number which dictates to the digital pseudo-random number generator its initial seed value and number of cycles the hardware needs to wait before using the output of the digital pseudo-random number to scramble the key, or possibly the serial number itself.

It is furthermore envisioned the possibility that these chips have adequate number of registers and memory space which could be randomly chosen by the VERIFIER (in METHOD 2, FIG. 2), or by the READER chip (METHOD 1, FIG. 1) to store this "variable parameter" or the final encryption/decryption results on the chip. Once again, this is done to eliminate the possibility that one could reverse engineer the physical layout of the chips to trace and find the location and content of the "key" stored on the chip.

As a further measure of security in fighting against counterfeiting the chips, it is further assumed that the chips may carry a "Chip Enable" bit which is implemented by using an eFUSE, or a Poly fuse, or a Metal fuse, or a One Time Programming (OTP) device. This "Chip Enable" bit prior to programming is set to zero, thus effectively disabling major functions on the chips such as encryption, decryption, etc. In order to enable the "Chip Enable" a finite state machine is implemented within the chips which would allow the "Chip Enable" to be asserted to become active, thus effectively enabling all the chip functionalities, provided a sequence of specific pattern of zeros and ones (a test vector) arrive at the input of the state machine. Such a vector pattern could be applied in a test mode situation once the chips are manufactured and arrive at the tester site. One may also use a pseudo number generator on board the chip as the source of a test vector in order to reduce time on the tester machine and thus reducing the cost. In such a scheme, the tester would only provide the seed value to the pseudo number generator, and once it reaches a specific pattern after a number of cycles, the Chip Enable will be asserted.

As mentioned before, the operator at the point of sale (or point of use such as hospitals where we are dealing with drugs for example) has to at least once verify the authenticity of the received READER chip 2. The simplest method is for the operator to contact the manufacturer by phone and communicate the identification number (ID) seen on the READER chip 2 for authentication (The manufacturer could warn of a counterfeited READER chip 2 if, among other things, the ID does match the physical location where the READER chip is expected to be found at, or if the ID is not found in the data base of the manufacturer, or if the ID has been already tagged as a counterfeit due to numerous replications, etc.). Alternatively, the operator could enter the ID into a secure web site provided by the manufacturer for authentication. This scheme, however, could be extended to also assigning and programming a unique ID into the READER chip by the manufacturer similar to what was done for the DECENC chip. The VERIFIER (Method 2, FIG. 2) could instruct the READER chip to decrypt or to encrypt the ID and the result could be then communicated to the manufacturer via phone or through a web site for authentication.

For the METHOD 2, the serial number seen on the label could come with or replaced with a corresponding bar code. Such a bar code is optically scanned by the VERIFIER (Method 2, FIG. 2: 17) and then is communicated to the READER chip. Alternatively, there could be a magnetic strip corresponding to and containing the serial number on the product (similar to those found on back of a credit card). In this situation, the magnetic strip is read by the VERIFIER and is then communicated to the READER chip. Alternatively, the serial number could be entered manually and then is passed on to the READER chip.

Note how universal the READER chip is for authenticating a product: The reader of this invention could imagine the situation where a consortium of manufacturers come together to make one READER device that is capable of authenticating products of all the manufacturers under the consortium umbrella. This is quite easily achieved by the fact that serial number may not only reveal the manufacture of a product, it may also select a specific key (in form of a "key pointer" and not the "key" itself) corresponding to a specific manufacturer as part of the "operation instruction" of the serial number. Furthermore, such a scenario would alleviate the cost of making a READER chip separately for each manufacturer.

To further improve the cost of manufacturing, it is envisioned that the designed chips have some test capabilities which could be exercised at the wafer level (wafer level testing). For example, each die could be programmed with a unique ID code that would be used by the tester to communicate with that particular die only. The tester first broadcasts a test command mode to all die found on a wafer; the tester then identifies the die on the wafer by broadcasting a particular ID associated with that die. The tester then initiaies a start test operation and requests that the chip (die) to perform an encryption/decryption or other necessary test functions on the saved serial number. The health of the die (chip) is then read back by the tester from the die with which it was in communication. The test is terminated with an end of test operation command from the tester, and the tester could then move on to the next die to perform similar test operations.

It is also recommended that some mechanism is provided to destroy the DECENC chip upon verification. This would eliminate the possibility that the chip could be smuggled after an authentication back to a black market. This could be achieved by either physically marking or destroying the DECENC chip, or provide an eFUSE which is zapped by the READER after an authentication process. The previously mentioned "Chip Enable" of the DECENC chip 1 could be used in this regard: "Chip Enable" bit could be deactivated optionally by the READER chip (Method 1, FIG. 1), or by the VERIFIER (Method 2, FIG. 2) after the authenticity of a product was confirmed. This would basically disable the DECENC chip and thus preventing the chip to find its way back to the black market.

The invention claimed is:

1. A method to authenticate a product comprising:
   providing a first encoding and decoding chip accompanying the product, wherein the first encoding and decoding chip is storing a serial number as a means of identifying said product; and separately providing a second encoding and decoding chip, wherein a long term storage bit compromising of a One Time Programming (OTP) device including an eFUSE is initially programmed to either logic 0 or logic 1 on the first and the second chip preventing the chips to operate normally right after manufacturing and subsequently are activated allowing normal operation of the two chips wherein such activation requires the two chips to receive a predetermined sequence of specific vector patterns, wherein said authentication method comprises steps of:
   a) the first encoding and decoding chip performs an encoding of said serial number if the serial number is decoded, or the first encoding and decoding chip performs a decoding of said serial number if the serial number is encoded; and
   b) the second encoding and decoding chip performs an encoding of said serial number if the serial number is decoded, or the second encoding and decoding chip performs a decoding of said serial number if the serial number is encoded; and
   c) the second encoding and decoding chip compares its result of encoding or decoding against the result of encoding or decoding from the first chip in step (a) and if the two results match the second encoding and decoding chip confirms the authenticity of the product.

2. A method in accordance with claim 1, wherein a key has been stored on both the first chip and the second chip and is used for encoding or decoding operation by both said chips.

3. A method in accordance with claim 1, wherein an opcode or other information is embedded within the serial number and is used by the first chip or the second chip to carry out the encoding or decoding operation and storing the results.

4. A method in accordance with claim 1, wherein the first chip receives its power or clock or data or instructions from the second chip via physical contacts or by wireless methods.

5. A method in accordance with claim 1, wherein the first chip has a status register or an interrupt mechanism to inform the second chip of completion of a task.

6. A method in accordance with claim 1, wherein the serial number is programmed onto the first chip using eFUSES, Poly Fuses, Metal Fuses, or similar one time programmable storage devices.

7. A method in accordance with claim 1, wherein the second chip's authenticity is confirmed via phone or a manufacture website using an identification tag that accompanies the second chip.

8. A method in accordance with claim 1, wherein the second chip is embedded in an enclosure equipped with means to display or to announce the authenticity or information about the nature of a product provided by the second chip.

9. A method in accordance with claim 1, wherein the first and second chips use a variable of the same value to first scramble a key or the serial number and then using the key to encode or to decode the serial number.

10. A method in accordance with claim 1, wherein a specific identification pattern is programmed on the first and second chips that could be used to identify and subsequently determine the health of a particular chip.

11. A method in accordance with claim 1, wherein a second long term storage bit, comprising of a One Time Programming (OTP) device including an eFUSE, in the first chip is disabled by the second chip to prevent the first chip to function and to operate normally.

12. A method to authenticate a product comprising:
    providing a product with a label containing an encoded or decoded serial number as a means of identifying said product and a first encoding and decoding chip storing the same serial number in an encoded or decoding format; and separately providing a second encoding and decoding chip; and a verifier entity that carries out the task of verification, wherein a long term storage bit compromising of a One Time Programming (OTP) device including an eFUSE is initially programmed to either logic 0 or logic 1 on the first and the second chip preventing the chips to operate normally right after manufacturing and subsequently are activated allowing normal operation of the two chips wherein such activation requires the two chips to receive a predetermined sequence of specific vector patterns, wherein said authentication method comprises steps of:
    a) the verifier requiring the first encoding and decoding chip to perform an encoding of said serial number if the serial number is decoded, or decoding of said serial number if the serial number is encoded; and
    b) the verifier requiring the second encoding and decoding chip to perform an encoding of said serial number if the serial number is decoded, or decoding of said serial number if the serial number is encoded; and
    c) the verifier compares the encoding or decoding results obtained in step (a) against the encoding or decoding results obtained in step (b) and if the two results match the verifier confirms the authenticity of the product.

13. A method in accordance with claim 12, wherein a key has been stored on both the first chip and the second chip and is used for encoding or decoding operation by both said chips.

14. A method in accordance with claim 12, wherein an opcode or other information is embedded within the serial number and is used by the first chip or the second chip to carry out the encoding or decoding operation and storing the results.

15. A method in accordance with claim 12, wherein the first and second chips receive their power or clock or data or instructions from the verifier via physical contacts or by wireless methods.

16. A method in accordance with claim 12, wherein the first and second chips have status register or an interrupt mechanism to inform the verifier of completion of a task.

17. A method in accordance with claim 12, wherein the serial number is programmed onto the first chip using eFUSES, Poly Fuses, Metal Fuses, or similar one time programmable storage devices.

18. A method in accordance with claim 12, wherein the second chip's authenticity is confirmed via phone or a manufacture website using an identification tag that accompanies the second chip.

19. A method in accordance with claim 12, wherein the second chip's authenticity is confirmed via an identification tag that has been programmed into the second chip, whereby the second chip will be instructed by the verifier to encode or to decode this identification tag and the result would be communicated via phone or a manufacture website for the authentication of the second chip.

20. A method in accordance with claim 12, wherein the verifier is equipped with means to display or to announce the authenticity or information about the nature of a product provided by the second chip and the first chip.

21. A method in accordance with claim 12, wherein the first and second chips use a variable of the same value to first scramble a key or the serial number and then using the key to encode or to decode the serial number.

22. A method in accordance with claim 12, wherein a specific identification pattern is programmed on the first and second chips that could be used to identify and subsequently determine the health of a particular chip.

23. A method in accordance with claim 12, wherein, a second long term storage bit, comprising of a One Time Programming (OTP) device including an eFUSE, in the first chip is disabled by the verifier to prevent the first chip to function and to operate normally.

* * * * *